United States Patent
Nishikawa et al.

(10) Patent No.: US 11,021,112 B2
(45) Date of Patent: Jun. 1, 2021

(54) DISPLAY CONTROL DEVICE AND COMPUTER-READABLE STORAGE MEDIUM

(71) Applicant: HONDA MOTOR CO., LTD., Tokyo (JP)

(72) Inventors: Yuji Nishikawa, Saitama (JP); Mutsumi Katayama, Saitama (JP); Naohide Aizawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/525,625

(22) Filed: Jul. 30, 2019

(65) Prior Publication Data

US 2020/0031290 A1    Jan. 30, 2020

(30) Foreign Application Priority Data

Jul. 30, 2018 (JP) .............................. JP2018-142694

(51) Int. Cl.
    *B60R 11/02*    (2006.01)

(52) U.S. Cl.
    CPC ...... *B60R 11/0264* (2013.01); *B60R 11/0235* (2013.01); *B60R 2300/302* (2013.01); *B60R 2300/605* (2013.01); *B60R 2300/70* (2013.01); *B60R 2300/8093* (2013.01)

(58) Field of Classification Search
    CPC .......... B60K 35/00; B60K 37/06; B60R 1/00; G08G 1/167
    See application file for complete search history.

(56) References Cited

U.S. PATENT DOCUMENTS

| | | | | |
|---|---|---|---|---|
| 2005/0154505 | A1* | 7/2005 | Nakamura | G01C 21/365 701/1 |
| 2009/0112389 | A1* | 4/2009 | Yamamoto | G08G 1/167 701/31.4 |
| 2010/0253539 | A1* | 10/2010 | Seder | G01S 13/87 340/903 |
| 2013/0151145 | A1* | 6/2013 | Ishikawa | G01C 21/3667 701/428 |
| 2014/0019005 | A1* | 1/2014 | Lee | G08G 1/0962 701/36 |
| 2016/0349066 | A1* | 12/2016 | Chung | B60K 35/00 |
| 2017/0176641 | A1* | 6/2017 | Zhu | G05D 1/0088 |
| 2017/0282717 | A1* | 10/2017 | Jang | B60K 37/06 |
| 2018/0101736 | A1* | 4/2018 | Han | G06T 11/60 |
| 2018/0265004 | A1* | 9/2018 | Kudou | B60R 1/00 |

(Continued)

FOREIGN PATENT DOCUMENTS

JP    2016115067 A    6/2016

*Primary Examiner* — Ke Xiao
*Assistant Examiner* — James S Nokham

(57) ABSTRACT

A display control device is provided, which includes an image storing section for storing a plurality of captured images in association with image capturing locations on a road, and a display control section for causing a captured image to be successively displayed, the captured image corresponding to each of a plurality of positions that are identified based on a user operation, where the display control section causes the captured image and an object related to an image capturing location of the captured image to be displayed such that the object is arranged on a position of a display screen corresponding to the image capturing location.

19 Claims, 12 Drawing Sheets

(56) References Cited

U.S. PATENT DOCUMENTS

2018/0350235 A1* 12/2018 Hyun ................. G08G 1/09623
2019/0144001 A1*  5/2019 Choi .................... B60W 50/14
                                                          701/117

* cited by examiner

DISPLAY CONTROL DEVICE AND COMPUTER-READABLE STORAGE MEDIUM

The contents of the following Japanese patent application are incorporated herein by reference: 2018-142694 filed in JP on Jul. 30, 2018

BACKGROUND

1. Technical Field

The present invention relates to a display control device and a computer-readable storage medium.

2. Related Art

A technology for switching display of street view images according to a flick operation and the like has been known (for example, see Patent Document 1).

PRIOR ART LITERATURE

Patent Document

[Patent Document 1] Japanese Patent Application Publication No. 2016-115067

SUMMARY

It is desirable to provide a display technology for enabling a user to intuitively grasp information that is related to a position of a road when displaying an image of the road.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
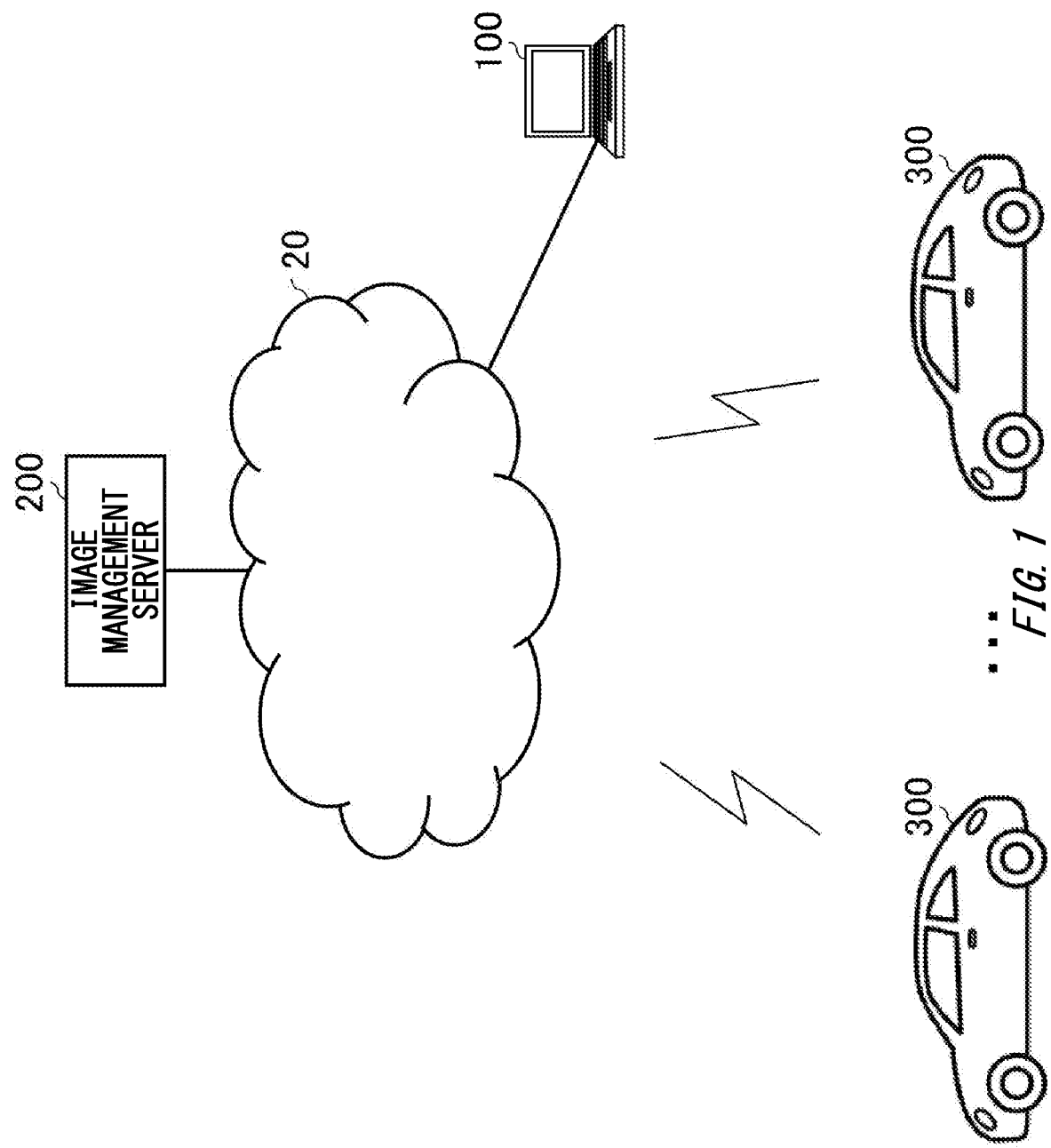
FIG. 1 schematically shows an example of a communication environment of a communication terminal 100.

FIG. 1 schematically shows an example of a communication environment of a communication terminal 100. The communication terminal 100 according to the present embodiment performs a display processing of displaying a captured image that is captured by a vehicle 300. The communication terminal 100 may be any terminal, for example, is a personal computer (PC), a tablet terminal, a smart phone and the like. The communication terminal 100 may be an example of a display control device.

The communication terminal 100 may receive a captured image from an image management server 200 that manages a plurality of captured images via a network 20 and store the received captured images. The network 20 may be any network. For example, the network 20 may include at least any one of the Internet, a mobile phone network such as a so-called 3rd Generation (3G), Long Term Evolution (LTE), 4th Generation (4G) and 5th Generation (5G) and the like, a public wireless Local Area Network (LAN), and a private network.

The image management server 200 receives a captured image from a plurality of vehicles 300 via the network 20, and manages the received captured image. For example, the vehicle 300 sends, to the image management server 200, captured images that are captured during a period in which the vehicle 300 is moving on a road, and location information that indicates a position on the road. The vehicle 300 may periodically send the captured images to the image management server 200. Also, the vehicle 300 may send, to the image management server 200, the captured images according to a request from the image management server 200.

Figure 2:
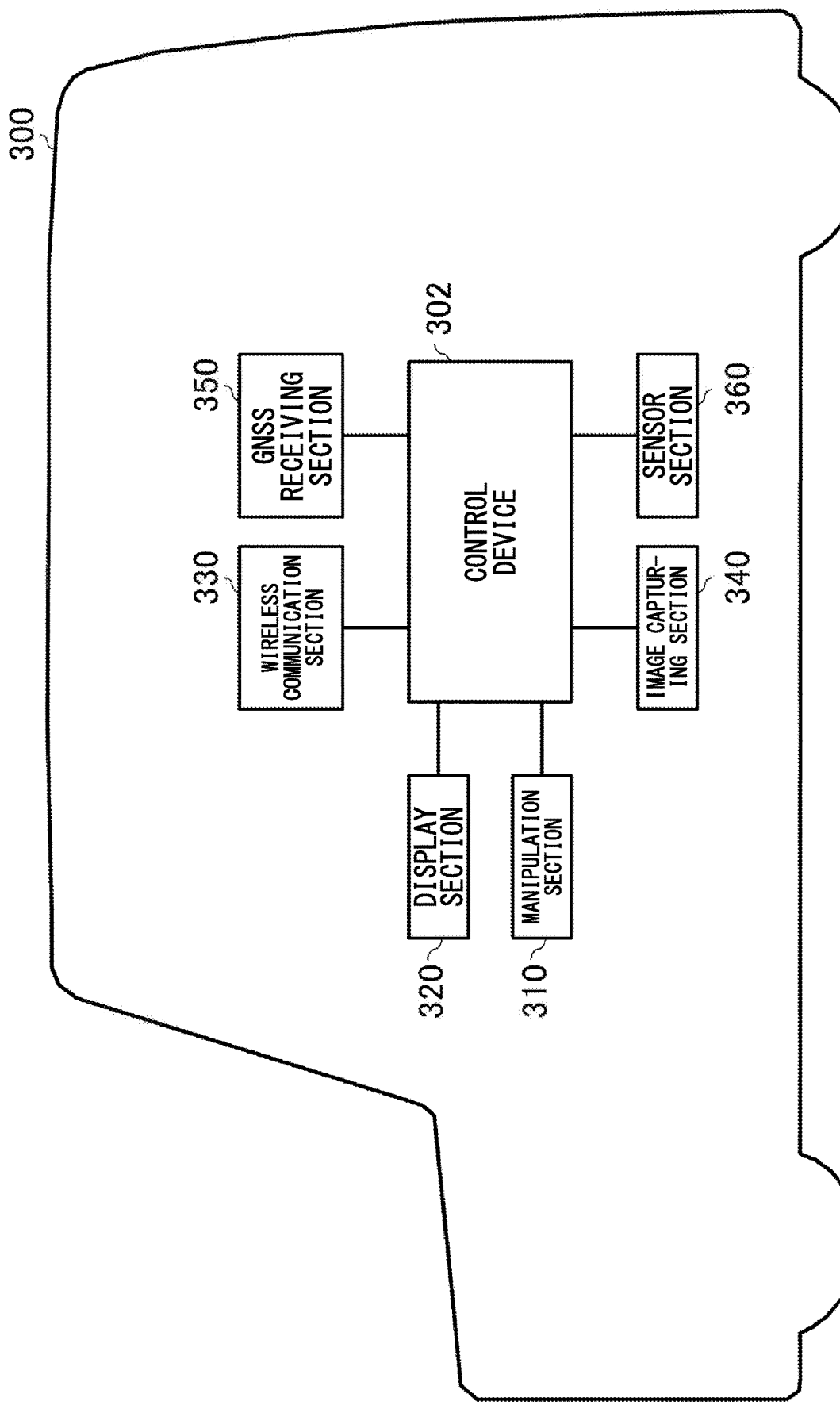
FIG. 2 schematically shows an example of a configuration of a vehicle 300.

FIG. 2 schematically shows an example of a configuration of the vehicle 300. The vehicle 300 includes a manipulation section 310, a display section 320, a wireless communication section 330, an image capturing section 340, a Global Navigation Satellite System (GNSS) receiving section 350, a sensor section 360, and a control device 302. At least some of these components may be components included in a so-called car navigation system.

The manipulation section 310 accepts a manipulation by a user of the vehicle 300. The manipulation section 310 may include physical manipulation buttons. The manipulation section 310 and the display section 320 may also be a touch panel display. The manipulation section 310 may also accept an audio manipulation. The manipulation section 310 may include a microphone and a speaker.

The wireless communication section 330 performs communication with the image management server 200 and the communication terminal 100 via the network 20. The wireless communication section 330 may include a communication unit that performs communication with the network 20 via a wireless base station in a mobile phone network. Also, the wireless communication section 330 may include a communication unit that performs communication with the network 20 via a Wi-Fi (registered trademark) access point.

The image capturing section 340 includes one or more cameras. The camera may also be a drive recorder. When the image capturing section 340 includes a plurality of cameras, the plurality of cameras are respectively arranged on different positions of the vehicle 300. Also, the plurality of cameras respectively capture images in different image-capturing directions.

The GNSS receiving section 350 receives radio waves transmitted from a GNSS satellite. The GNSS receiving section 350 may also identify a position of the vehicle 300 based on a signal received from a GNSS satellite.

The sensor section 360 includes one or more sensors. The sensor section 360 includes, for example, an acceleration sensor. The sensor section 360 includes, for example, an angular velocity sensor (gyro sensor). The sensor section 360 includes, for example, a geomagnetic sensor. The sensor section 360 includes, for example, a vehicle speed sensor.

The control device 302 controls the manipulation section 310, the display section 320, the wireless communication section 330, the image capturing section 340, the GNSS receiving section 350 and the sensor section 360, and performs various processes. The control device 302 performs a navigation process, for example. The control device 302 may perform a similar navigation process to a navigation process that is performed by a publicly known car navigation system.

For example, the control device 302 identifies a current position of the vehicle 300 based on an output from the GNSS receiving section 350 and the sensor section 360, reads out map data corresponding the current position, and causes the display section 320 to display the map data. Also, the control device 302 accepts an input of a destination via the manipulation section 310, identifies a recommended route from the current position of the vehicle 300 to the destination, and causes the display section 320 to display the recommended route. When accepting a route selection, the control device 302 performs guidance of a pathway on which the vehicle 300 is to travel via the display section 320 and a speaker according to the selected route.

The control device 302 according to the present embodiment performs a sending process of sending a captured image captured by the image capturing section 340 to the image management server 200. Communication between the control device 302 and the outside of the communication terminal 100 is performed by the wireless communication section 330.

The control device 302 sends, to the image management server 200, the captured image captured by the image capturing section 340 and location information that indicates an image capturing location. The control device 302 may further send information that is sensed by the sensor section 360. For example, the control device 302 sends a vehicle speed when the captured image is captured.

The vehicle 300 may be a so-called general vehicle. Also, the vehicle 300 may also be a dedicated vehicle for capturing a road of each location. The dedicated vehicle travels while systematically capturing images of a road of each location, for example. The dedicated vehicle may capture, by using one camera, an image of a road of each location from the same view point, and send the captured image to the communication terminal 100, the image management server 200 and the like.

Figure 3:
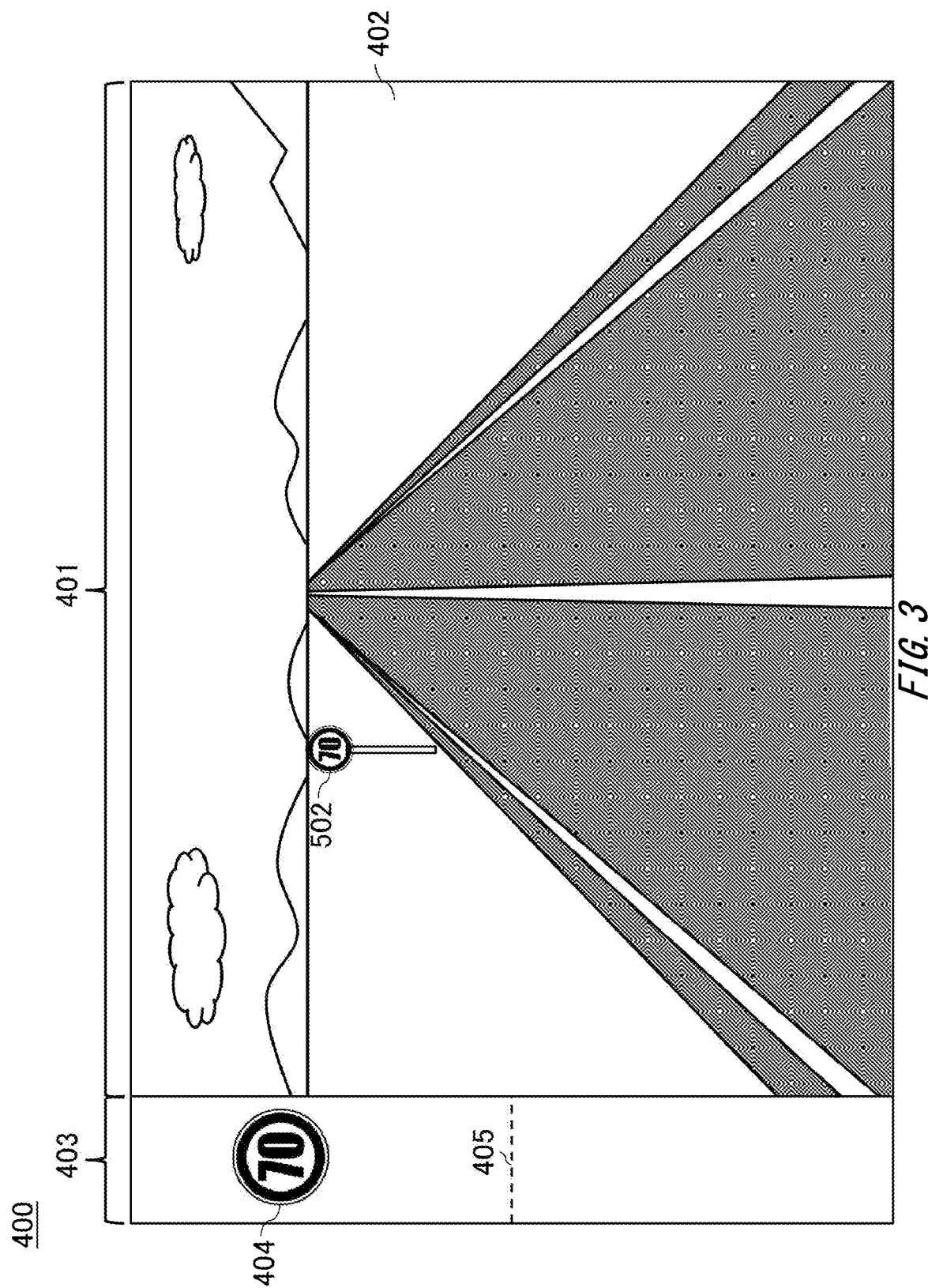
FIG. 3 schematically shows an example of a display data 400 that is displayed by the communication terminal 100.

FIG. 3 schematically shows an example of display data 400 displayed by the communication terminal 100. The display data 400 may include a captured image display region 401 and an object arrangement region 403. A captured image 402 is arranged on the captured image display region 401. An object such as a traffic sign object 404 is arranged on the object arrangement region 403. Note that the display data 400 may not include the object arrangement region 403, and in this case, the object may be arranged on the captured image 402.

The communication terminal 100 may cause a display that is included in itself to display the display data 400 as shown in FIG. 3. Also, the communication terminal 100 may also cause a display apparatus that is outside the communication terminal 100 to display the display data 400 by sending the display data 400 to the display apparatus.

The communication terminal 100 may cause a plurality of pieces of display data 400 to be successively displayed based on a user operation. For example, when accepting a flick operation in an upward direction, the communication terminal 100 causes the plurality of pieces of display data 400 corresponding to a direction of travelling forward a road to be successively displayed. Also, for example, when accepting a flick operation in a downward direction, the communication terminal 100 causes the plurality of pieces of display data 400 corresponding to a direction of travelling backward a road to be successively displayed.

It is preferable that the captured image 402 included in the plurality of pieces of display data 400 successively displayed in this way is captured by the same in-vehicle camera. That is, it is preferable that the communication terminal 100 does not mixedly use captured images captured by a plurality of vehicles 300 but uses a plurality of captured images captured by one camera that one vehicle 300 has. Accordingly, when the plurality of pieces of display data 400 corresponding to the direction of travelling forward a road are successively displayed, or when the plurality of pieces of display data 400 corresponding to the direction of travelling backward a road are successively displayed, the images can be prevented from being blurred vertically and horizontally.

For example, the communication terminal 100 receives a captured image captured by a dedicated vehicle from the image management server 200 and stores the received captured image. Also, for example, the communication terminal 100 receives a captured image captured by one vehicle 300 from the image management server 200 and stores the received captured image. Also, when captured images captured by a plurality of vehicles 300 are received from the image management server 200, the communication terminal 100 may manage the captured images for each vehicle 300. Also, the communication terminal 100 may manage the captured images received from the plurality of vehicles 300 for each vehicle 300. When the vehicles 300 capturing the captured images each have a plurality of cameras, the communication terminal 100 may manage the captured images for each vehicle 300 and for each camera.

It is preferable that when mixedly using the captured images captured by the plurality of vehicles 300, the communication terminal 100 performs image processing on each captured image so as to prevent the captured images from being blurred vertically and horizontally when the captured images are successively displayed. For example, the communication terminal 100 recognizes a lane by performing an image analysis on a captured image to perform alignment based on a position of the lane. Accordingly, the blurring can be corrected. Note that such an image processing may also be performed by the image management server 200.

The communication terminal 100 may arrange the traffic sign object 404 on a position of a display screen that is based on a positional relationship between an image capturing location of a captured image 402 included in the display data 400 and a sign position at which a traffic sign 502 is placed. For example, when causing the captured image 402 to be displayed, the captured image 402 captured at the image capturing location that is closest to the sign position, the communication terminal 100 arranges the traffic sign object 404 on a reference position 405.

When causing the captured image 402 to be displayed, the captured image 402 captured at the image capturing location that is in front of the sign position, the communication terminal 100 may arrange a traffic sign object 404 upper than the reference position 405 as a distance between the image capturing location and the sign position becomes larger. Also, when causing the captured image 402 to be displayed, the captured image 402 captured at the image capturing location that is behind the sign position, the communication terminal 100 may arrange the traffic sign object 404 lower than the reference position 405 as the distance between the image capturing location and the sign position becomes larger. Accordingly, for example, the following display can be realized: when the captured images 402 are sequentially displayed in a direction of travelling forward a road, if the traffic sign 502 is closer, the traffic sign object 404 is gradually closer to the reference position 405 from an upper side, and when the captured image 402 right beside the traffic sign 502 is displayed, the traffic sign object 404 is positioned on the reference position 405, and when further travelling forward, the traffic sign object 404 moves downward. Accordingly, a viewer can grasp the position of the traffic sign 502 while viewing the captured image.

Figure 4:
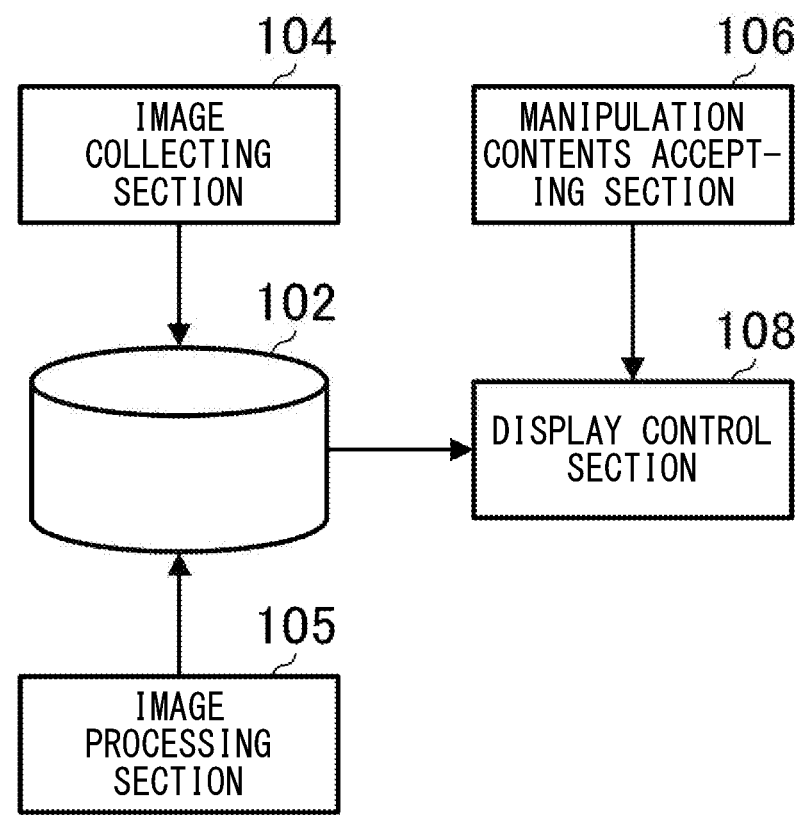
FIG. 4 schematically shows an example of a functional configuration of the communication terminal 100.

FIG. 4 schematically shows an example of a functional configuration of the communication terminal 100. The communication terminal 100 includes a storage section 102, an image collecting section 104, an image processing section 105, a manipulation contents accepting section 106 and a display control section 108. Note that the communication terminal 100 does not necessarily include all of these components.

The storage section 102 stores various types of information. The storage section 102 stores a captured image captured by the vehicle 300 and location information that indicates an image capturing location on a road in association with each other. Also, the storage section 102 stores an image that represents an object such as the traffic sign object 404.

The image collecting section 104 collects captured images. The image collecting section 104 may receive a captured image and location information from the image management server 200 and store the captured image and the location information in the storage section 102. Also, the image collecting section 104 may also receive, from the image management server 200, information such as a vehicle speed when the vehicle 300 captures the captured image and store the received information in the storage section 102. The image collecting section 104 may also receive captured images and location information from a plurality of vehicles 300 and store the received captured images and location information in the storage section 102.

The image processing section 105 performs image processing on the captured image that has been stored in the storage section 102. For example, the image processing section 105 performs image processing such that a plurality of captured images captured on roads that are targets respectively among a plurality of roads approximate images that are captured by the same image capturing section 340 of the same vehicle 300. For example, the image processing section 105 recognizes a lane by performing an image analysis on captured images and performs alignment based on a position of the lane.

Because positions and angles of the image capturing sections 340 with respective to the roads are different, and performances, settings and the like of the image capturing section 340 are different, viewing ways of the captured images captured by different vehicles 300 are different. For example, when successively displaying the captured images along a road, if the captured images captured by different vehicles 300 are mixed, the road looks blurred vertically and horizontally. For this respect, even when the images are captured by one vehicle 300, if the one vehicle 300 has a plurality of image capturing sections 340, a similar situation may occur. On the other hand, by performing, by the image processing section 105, the image processing as described above, such blurring can be suppressed.

The manipulation contents accepting section 106 accepts manipulation contents to the manipulation section included in the communication terminal 100. For example, when the communication terminal 100 has a mouse, the manipulation contents accepting section 106 accepts manipulation contents of a pointing input by a mouse, a flick operation, a steering wheel operation and the like. Also, for example, when the communication terminal 100 has a touch panel display, the manipulation contents accepting section 106 accepts manipulation contents according to a pointing input, a flick operation and the like to the touch panel display.

The display control section 108 causes captured images that have been stored in the storage section 102 to be displayed. The display control section 108 may cause a display included in the communication terminal 100 to display the captured images. Also, the display control section 108 may also cause a display apparatus that is outside the communication terminal 100 to display the captured images by sending the captured images to the display apparatus.

The display control section 108 may cause a plurality of captured images to be successively displayed according to the flick operation, the steering wheel operation and the like. For example, the display control section 108 causes a plurality of captured images to be successively displayed, the plurality of captured images corresponding to a first direction of a road when accepting a flick operation in an upward direction, and causes the plurality of captured images to be successively displayed, the plurality of captured images corresponding to a second direction that is opposite to the first direction of the road when accepting a flick operation in a downward direction. Also, for example, the display control section 108 causes a plurality of captured images to be successively displayed, the plurality of captured images corresponding to a first direction of a road when accepting a steering wheel operation in a first rotation direction, and causes the plurality of captured images to be successively displayed, the corresponding to a second direction that is opposite to the first direction of the road when accepting a steering wheel operation in a second rotation direction.

It is preferable that when the storage section 102 stores a captured image captured by a dedicated vehicle, the display control section 108 sets the captured image captured by the dedicated vehicle only as a displayed object. It is preferable that when the storage section 102 does not store captured images captured by a dedicated vehicle or when the number of the captured images captured by the dedicated vehicle is small, the display control section 108 sets a plurality of captured images captured by one vehicle 300 only as displayed objects among a plurality of captured images that have been stored in the storage section 102. It is preferable that when the one vehicle 300 has a plurality of image capturing sections 340, the display control section 108 sets a plurality of captured images captured by the one image capturing section 340 only as the displayed objects. It is preferable that when a plurality of captured images captured by a plurality of vehicles 300 are set as the displayed objects, the display control section 108 sets a plurality of captured images on which image processing is performed by the image processing section 105 as the displayed objects.

The display control section 108 causes a captured image and an object that is related to an image capturing location of the captured image to be displayed such that the captured image and the object are arranged on a position of a display screen corresponding to the image capturing location. The object may represent a target that is positioned within a predetermined distance from the image capturing location. The object is a traffic sign object that represents a traffic sign that is placed within a predetermined distance from the image capturing location, for example. Also, the object is a spot object that represents a spot that is positioned within a predetermined distance from the image capturing location, for example. The spot may be any location. As examples of the spot, the followings may be given: an amusement spot such as a zoo and an amusement park, a shopping spot such as a shopping mall and a convenience store, and a traffic spot and the like such as a parking area and a service area.

For example, the display control section 108 arranges the object on a position of the display screen that is based on a positional relationship between a position of the target and an image capturing location of the captured image. When causing the captured image to be displayed, the captured image captured at the image capturing location that is closer to the position of the target than another captured image is, the display control section 108 may arrange the object on a reference position of the display screen. For example, when causing the captured image to be displayed, the captured image captured at the image capturing location that is the closest to the position of the target, the display control section 108 arranges the object on the reference position of the display screen.

Further, when causing the captured image to be displayed, the captured image captured at the image capturing location that is in front of the position of the target, the display control section 108 may arrange the object upper than the reference position as a distance between the image capturing location and the position of the target becomes larger. Also, when causing the captured image to be displayed, the captured image captured at the image capturing location that is behind the position of the target, the display control section 108 may arrange the object lower than the reference position as the distance between the image capturing location and the position of the target becomes larger.

The display control section 108 may also cause the object to be displayed in a display size that is based on the positional relationship between the position of the target and the image capturing location. For example, the display control section 108 causes the object to be displayed in a larger display size as the image capturing location is closer to the position of the target.

Figure 5:
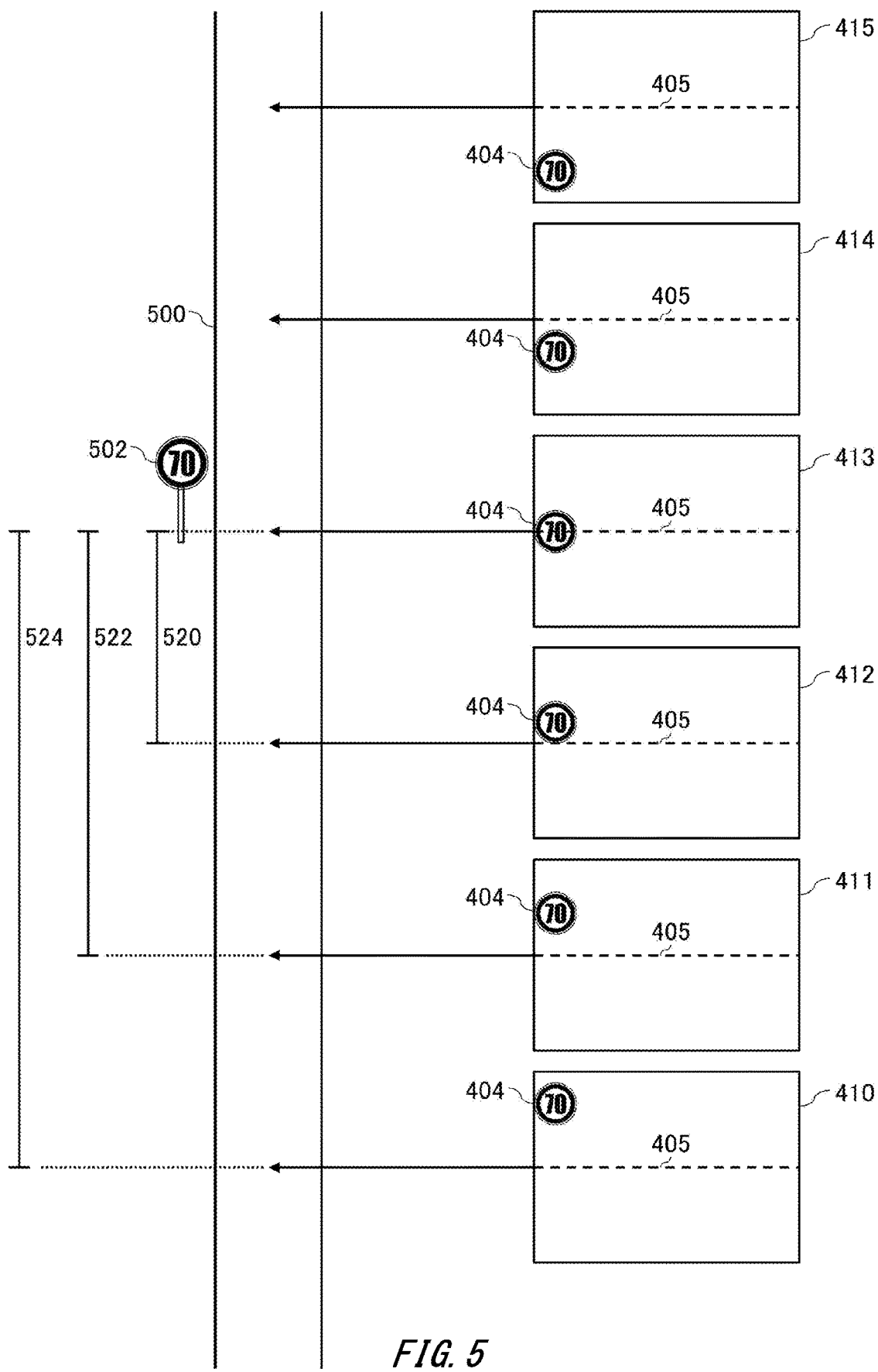
FIG. 5 schematically shows a display example of a traffic sign object 404.

FIG. 5 schematically shows a display example of the traffic sign object 404. FIG. 5 shows a case where among the captured image 410, the captured image 411, the captured image 412, the captured image 413, the captured image 414 and the captured image 415, an image capturing location of the captured image 413 is the closest to a sign position of the traffic sign 502 on a road 500.

When causing the captured image 412, the captured image 411 and the captured image 410 to be displayed, the display control section 108 may arrange the traffic sign object 404 on positions that are upper than the reference position 405 and that are respectively according to a distance 520, a distance 522 and a distance 524 that are respectively between those image capturing locations and the sign position, as shown in FIG. 5. The positional relationship between the image capturing location and the sign position may be an example of a positional relationship between the image capturing location and the position of the target. The distance between the image capturing location and the sign position may be an example of the distance between the image capturing location and the target position.

Similarly, when causing the captured image 414 and the captured image 415 to be displayed, the display control section 108 may arrange the traffic sign object 404 on positions that are lower than the reference position 405 and that are respectively according to a distance between those image capturing locations and the sign position.

Note that although an example in which the traffic sign object 404 is arranged on the position according to a distance between the image capturing location and the sign position is given and described here, the arrangement is not limited to this. The display control section 108 may also arrange the traffic sign object 404 according to a vehicle speed when the captured image is captured.

For example, the display control section 108 first determines, as the reference position 405, to set the display position of the traffic sign object 404 when displaying the captured image 413 captured at an image capturing location that is the closest to the sign position among a plurality of captured images. Further, the display control section 108 determines to set the display position of the traffic sign object 404 when displaying the captured image 412 adjacent to the captured image 413 to be further apart upward from the reference position 405 as the vehicle speed becomes faster. Similarly, the display control section 108 determines the display position of the traffic sign object 404 for the captured image 411 and the captured image 410 as well.

Also, the display control section 108 determines to set the display position of the traffic sign object 404 when displaying the captured image 414 adjacent to the captured image 413 to be further apart downward from the reference position 405 as the vehicle speed becomes faster. Similarly, the display control section 108 may determine the display position of the traffic sign object 404 for the captured image 415 as well.

Figure 6:
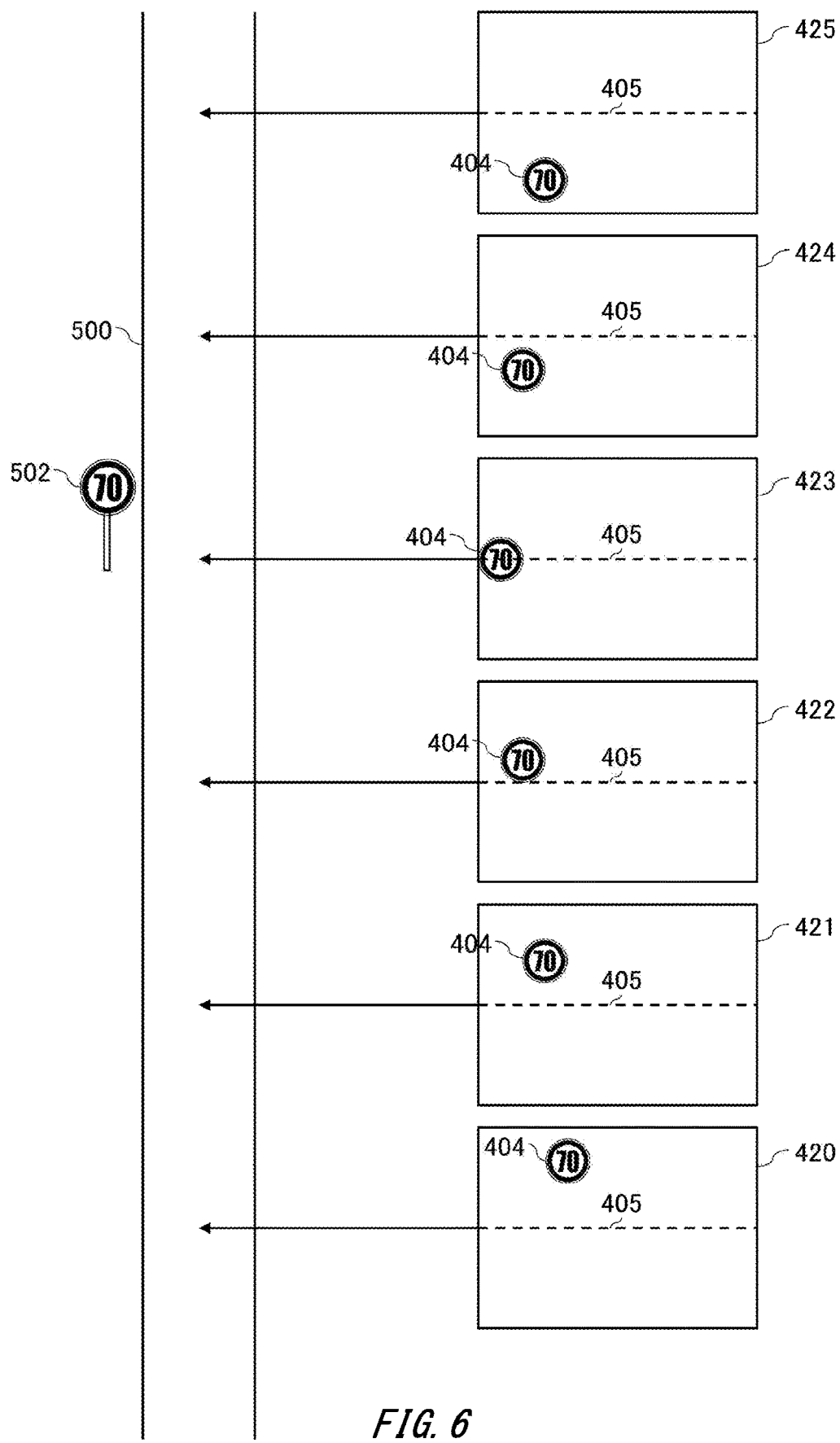
FIG. 6 schematically shows a display example of the traffic sign object 404.

FIG. 6 schematically shows a display example of the traffic sign object 404. FIG. 6 shows a case where the image capturing location of the captured image 423 is the closest to the sign position of the traffic sign 502 on the road 500 among the captured image 420, the captured image 421, the captured image 422, the captured image 423, the captured image 424 and the captured image 425. Here, differences from FIG. 5 are mainly described.

The display control section 108 may arrange the traffic sign object 404 on a position that is closer to a center in a lateral direction on the display screen as a distance between the image capturing location and the sign position becomes larger, as shown in FIG. 6. Accordingly, the following display can be provided: the traffic sign object 404 appears from an upper end of the center in the lateral direction of the display screen and moves left downward as the traffic sign object 404 is closer to the traffic sign 502. A movement amount in the lateral direction may be settable arbitrarily.

Figure 7:
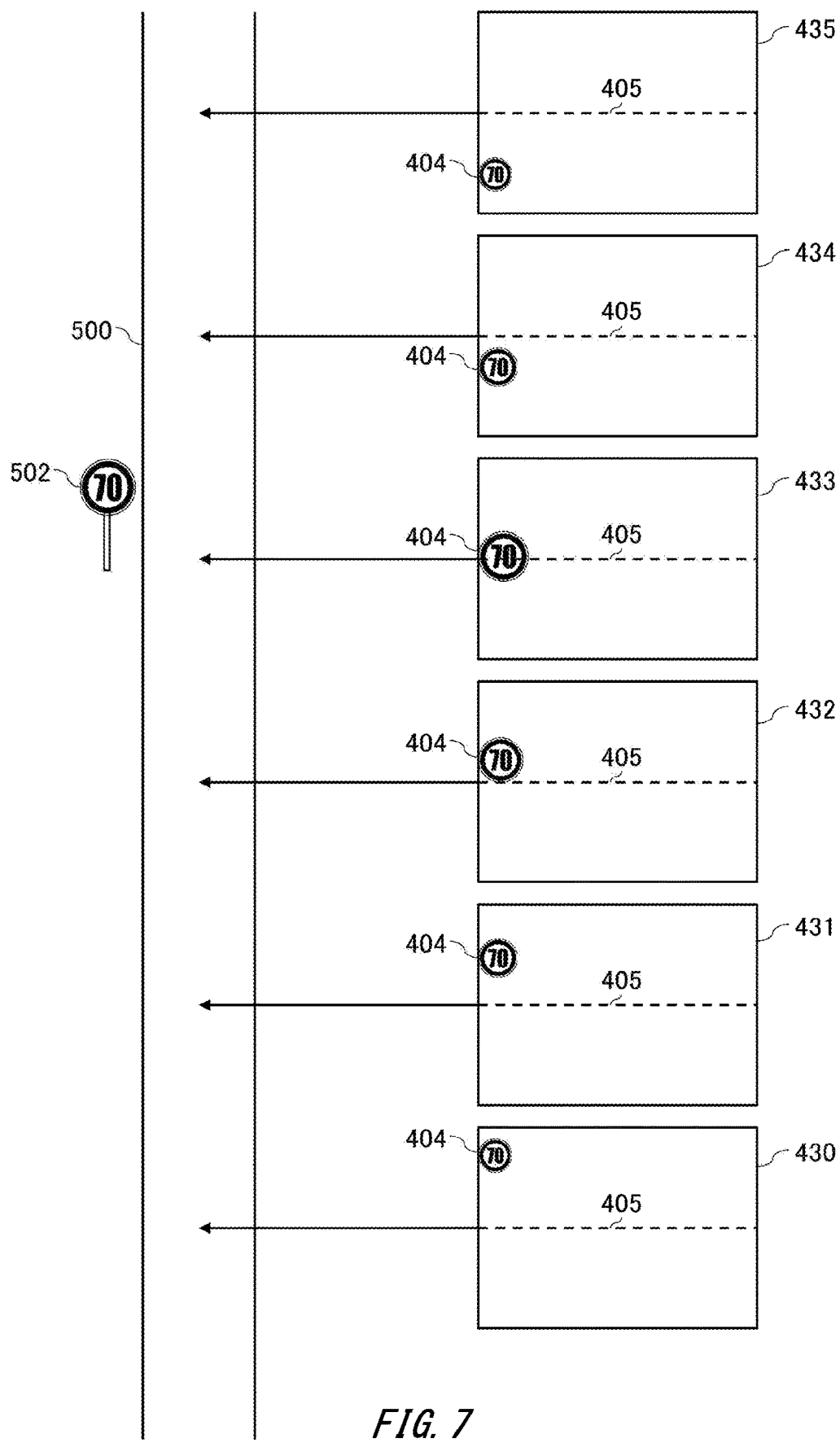
FIG. 7 schematically shows a display example of the traffic sign object 404.

FIG. 7 schematically shows a display example of the traffic sign object 404. FIG. 7 shows a case where among the captured image 430, the captured image 431, the captured image 432, the captured image 433, the captured image 434 and the captured image 435, the image capturing location of the captured image 433 is the closest to the sign position of the traffic sign 502 on the road 500. Here, differences from FIG. 5 are mainly described.

The display control section 108 may set the display size of the traffic sign object 404 to be smaller as the distance between the image capturing location and the sign position becomes larger, as shown in FIG. 7. Accordingly, the following display can be provided: the traffic sign object 404 appears from the upper end of the display screen, gradually becomes larger when moving toward the reference position 405, and gradually becomes smaller when passing by the reference position 405.

Figure 8:
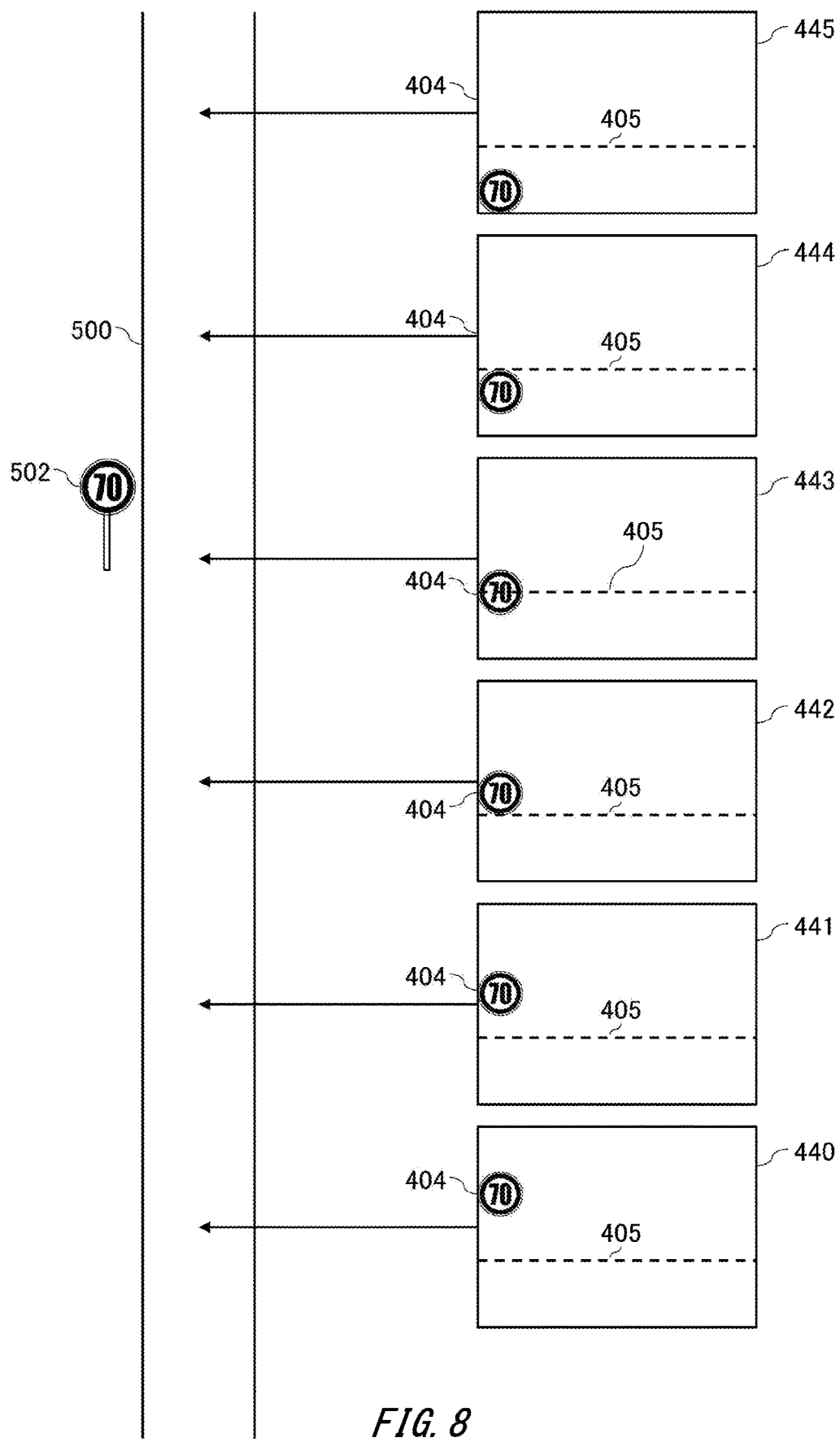
FIG. 8 schematically shows a display example of the traffic sign object 404.

FIG. 8 schematically shows a display example of the traffic sign object 404. FIG. 8 shows a case where among the captured image 440, the captured image 441, the captured image 442, the captured image 443, the captured image 444 and the captured image 445, the image capturing location of the captured image 443 is the closest to the sign position of the traffic sign 502 on the road 500. Here, differences from FIG. 5 are mainly described.

Although FIG. 5 shows the case where the reference position 405 is positioned on a center in an up-down direction of the display screen, the reference position 405 may also be positioned lower than the center in the up-down direction on the display screen, as shown in FIG. 8. FIG. 8 shows a case where the reference position 405 is a position that is two-thirds in length from the top of the display screen in the up-down direction. By arranging the reference position 405 lower than the center in the up-down direction on the display screen, a captured image when moving closer to the traffic sign 502 can be displayed more preferentially than a captured image when moving away from the traffic sign 502.

Figure 9:
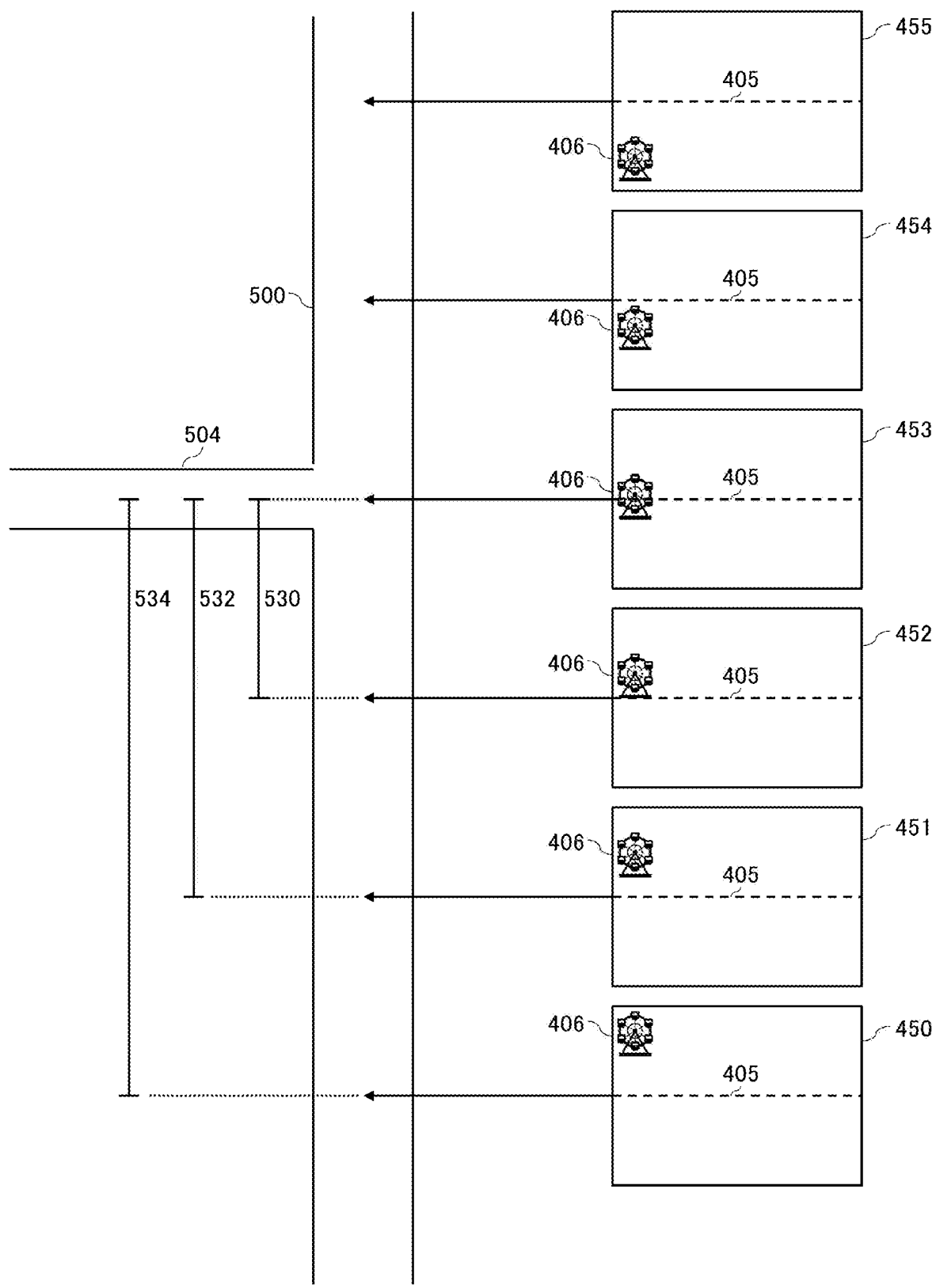
FIG. 9 schematically shows a display example of a spot object 406.
Figure 10:
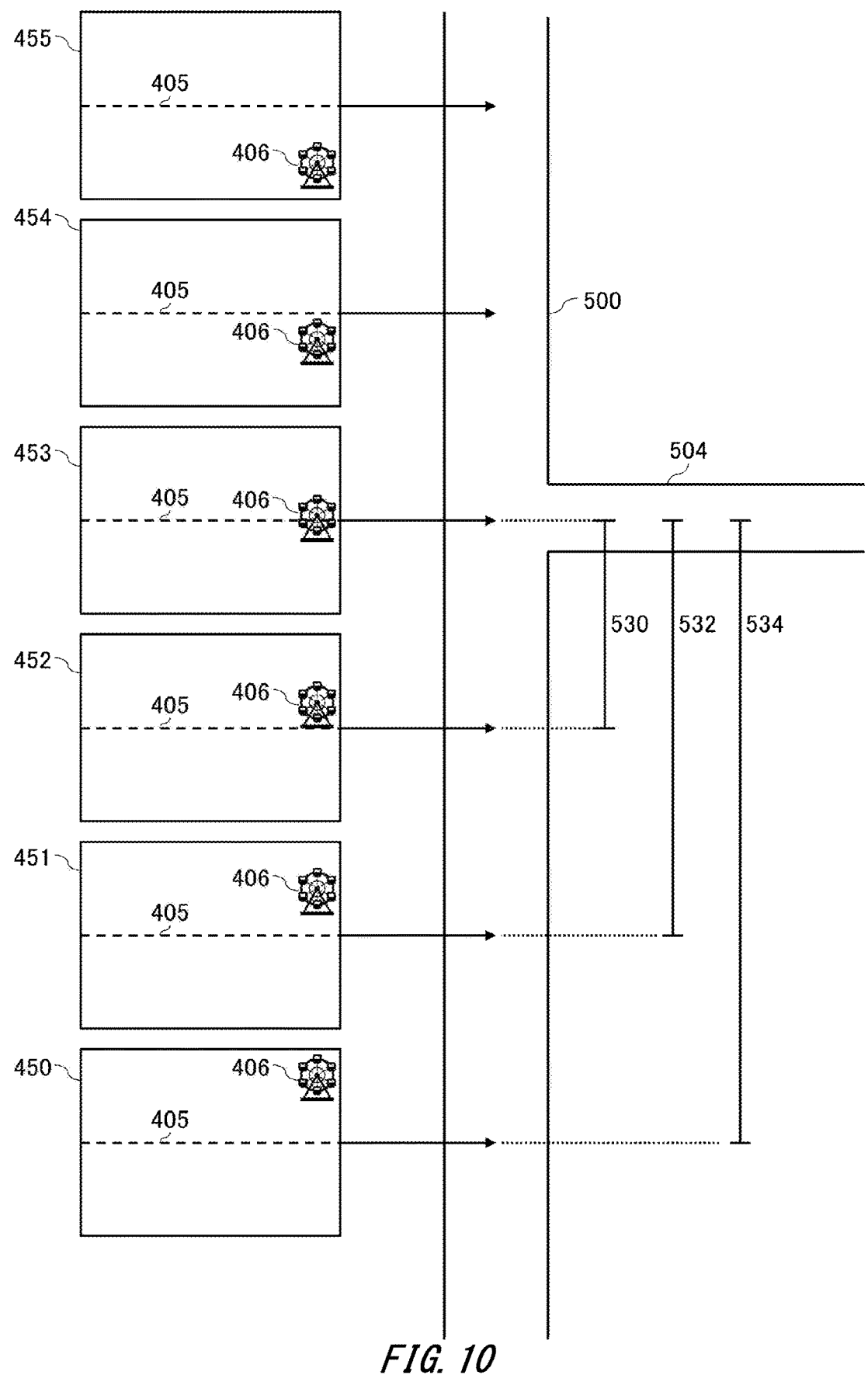
FIG. 10 schematically shows a display example of the spot object 406.

FIG. 9 and FIG. 10 schematically show a display example of a spot object 406. Here, differences from FIG. 5 are mainly described.

FIG. 9 and FIG. 10 show the spot object 406 that represents an amusement park. Also, FIG. 9 and FIG. 10 show a case where among the captured image 450, the captured image 451, the captured image 452, the captured image 453, the captured image 454 and the captured image 455, the image capturing location of the captured image 453 is the closest to a branch 504 that leads to the amusement park and that is on the road 500.

As shown in FIG. 9 and FIG. 10, when causing the captured image 452, the captured image 451 and the captured image 450 to be displayed, the display control section 108 may arrange the spot object 406 on positions that are upper than the reference position 405 and that are respectively according to a distance 530, a distance 532 and a distance 534 respectively between those image capturing locations and the branch 504. The positional relationship between the respective image capturing location and the branch 504 may be an example of a positional relationship between the respective image capturing location and the position of the target. The distance between the respective image capturing location and the branch 504 may be an example of a distance between the image capturing location and the position of the target.

Similarly, when causing the captured image 454 and the captured image 455 to be displayed, the display control section 108 may arrange the spot object 406 on a position that is lower than the reference position 405 and that is according to the distance respectively between those image capturing locations and the branch 504.

Similar to the display example of the traffic sign object 404 shown in FIG. 6, the display control section 108 may arrange the spot object 406 on a position that is closer to the center in the lateral direction on the display screen as the distance between the respective image capturing location and the branch 504 becomes larger. Also, similar to the display example of the traffic sign object 404 shown in FIG. 7, the display control section 108 may set the display size of the spot object 406 to be smaller as the distance between the respective image capturing location and the branch 504 becomes larger. Also, similar to the display example of the traffic sign object 404 shown in FIG. 8, the display control section 108 may arrange the reference position 405 lower than the center in the up-down direction on the display screen.

When the position of the amusement park is positioned on the left side of a vehicle that captures the captured image, the display control section 108 may arrange the spot object 406 on the left side of the display screen as shown in FIG. 9. When the position of the amusement park is positioned on the right side of a vehicle that captures the captured image, the display control section 108 may arrange the spot object 406 on the right side of the display screen, as shown in FIG. 10.

Although in the above-described embodiment the case where the communication terminal 100 performs the display processing of displaying the captured image captured by the vehicle 300 is described as an example, it is not limited to this. The image management server 200 may also perform the display processing. The image management server 200 may be an example of a display control device. The image management server 200 may cause a display included in itself to display a captured image. Also, the image management server 200 may also cause a destination to which a captured image is sent, such as a communication terminal, to display the captured image by sending the captured image via the network 20.

Figure 11:
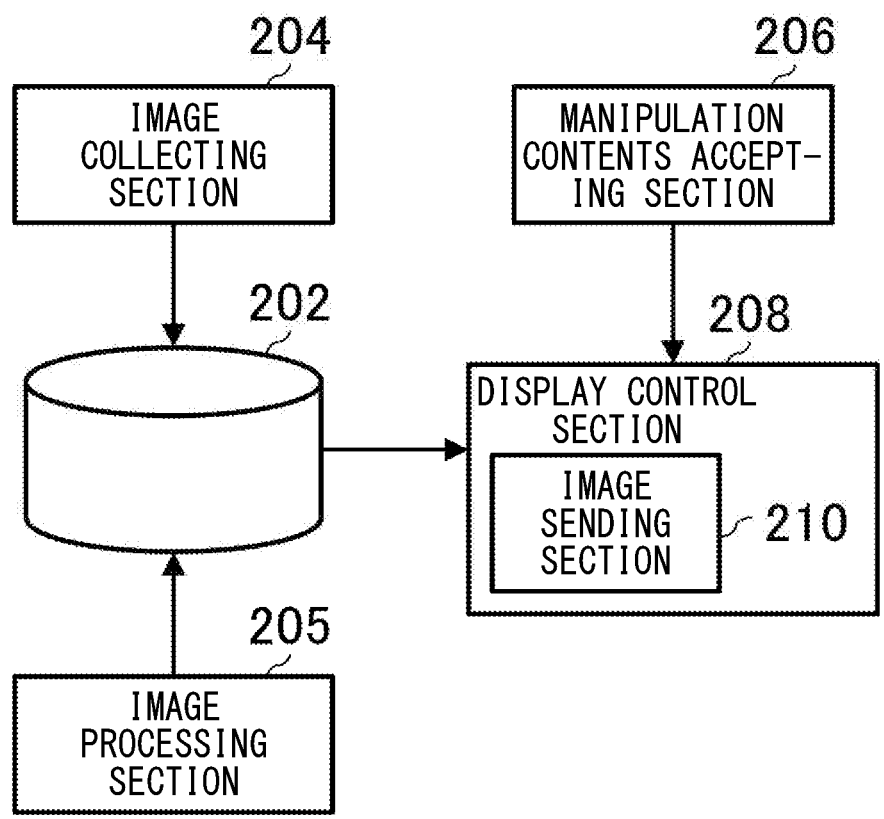
FIG. 11 schematically shows an example of a functional configuration of an image management server 200.

FIG. 11 schematically shows an example of a functional configuration of the image management server 200. The image management server 200 includes a storage section 202, an image collecting section 204, an image processing section 205, a manipulation contents accepting section 206 and a display control section 208. Note that the image management server 200 does not necessarily include all of these components. Here, differences in the processing contents different from the communication terminal 100 shown in FIG. 4 are mainly described.

The storage section 202 stores various types of information. The storage section 202 stores a captured image captured by the vehicle 300 and location information that indicates an image capturing location on a road in association with each other. Also, the storage section 202 stores an image that represents an object such as the traffic sign object 404.

The image collecting section 204 collects captured images. The image collecting section 204 may receive captured images and location information from a plurality of vehicles 300 via the network 20 and store the received captured images and location information in the storage section 202. The image processing section 205 performs image processing on the captured images that have been stored in the storage section 102.

The manipulation contents accepting section 206 may accept the manipulation contents to a manipulation section included in the image management server 200. For example, when the image management server 200 has a mouse, the manipulation contents accepting section 206 accepts manipulation contents of a pointing input, a flick operation, a steering wheel operation and the like by the mouse. Also, for example, when the image management server 200 has a touch panel display, the manipulation contents accepting section 206 accepts manipulation contents of a pointing input, a flick operation and the like to the touch panel display.

The manipulation contents accepting section 206 may also receive the manipulation contents from a communication party, such as the communication terminal 100, via the network 20. For example, when the communication party has a mouse, the manipulation contents accepting section 206 accepts the manipulation contents of a pointing input, a flick operation, a steering wheel operation and the like by the mouse. Also, for example, when the communication party has a touch panel display, the manipulation contents accepting section 206 accepts the manipulation contents of a pointing input, a flick operation and the like to the touch panel display.

The display control section 208 performs the display processing of causing captured images that have been stored in the storage section 202 to be displayed. The display control section 208 may cause a display included in the image management server 200 to display the captured images. The display processing by the display control section 208 may be similar to the display control section 108.

Also, the display control section 208 has an image sending section 210. The image sending section 210 causes a communication party, such as the communication terminal 100, to display captured images by sending the captured image to the communication party. Specific display contents may be similar to the display by the display control section 108.

Figure 12:
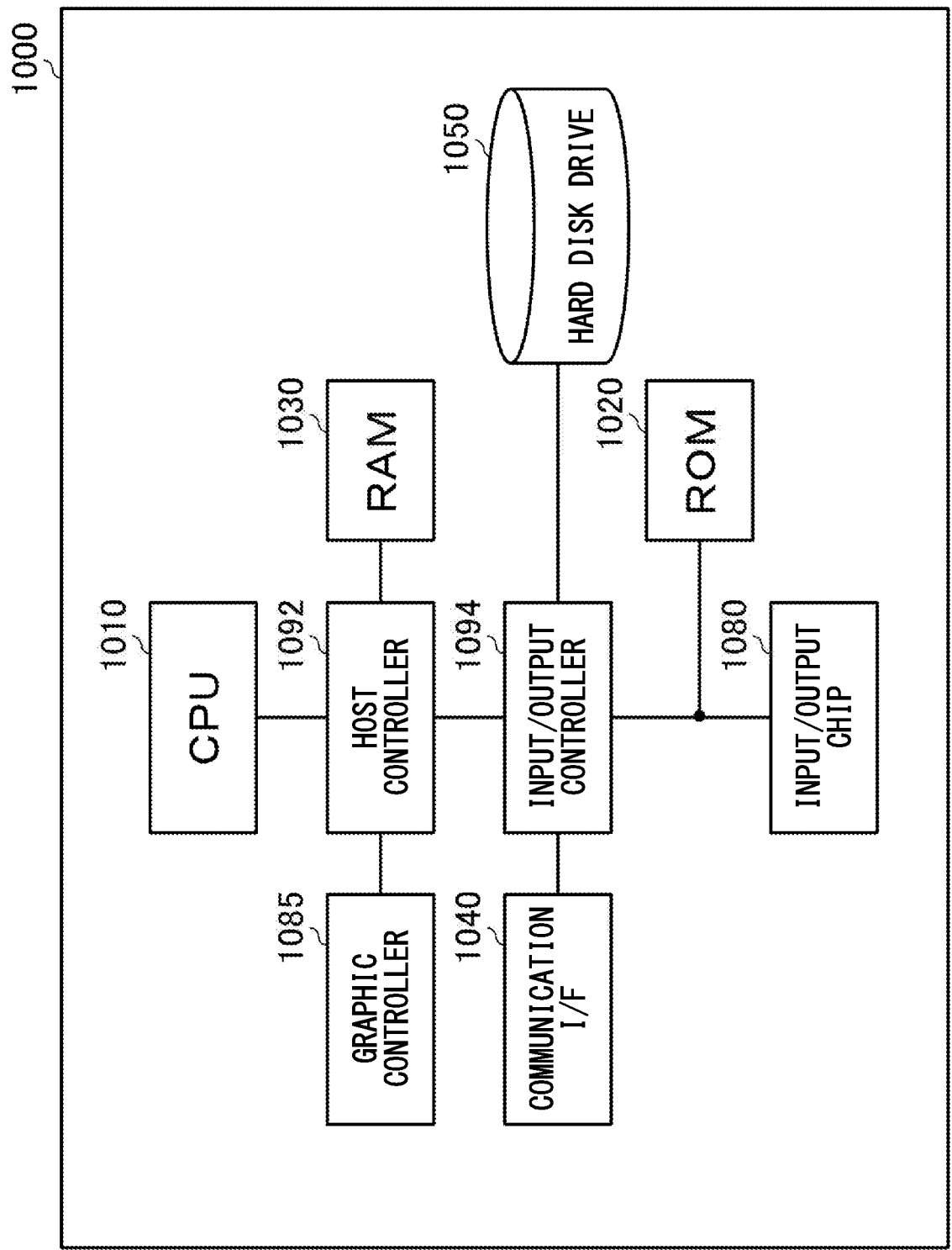
FIG. 12 schematically shows an example of a hardware configuration of a computer 1000 that functions as the communication terminal 100 or the image management server 200.

FIG. 12 schematically shows an example of the computer 1000 that functions as the communication terminal 100 or the image management server 200. The computer 1000 according to the present embodiment includes a CPU-surrounding section including a CPU 1010, a RAM 1030, and a graphic controller 1085, which are connected to each other by a host controller 1092, and an input/output section including a ROM 1020, a communication I/F 1040, a hard disk drive 1050, and an input/output chip 1080, which are connected to the host controller 1092 by an input/output controller 1094.

The CPU 1010 operates based on programs stored in the ROM 1020 and the RAM 1030 to control each section. The graphic controller 1085 acquires image data generated such as by the CPU 1010 on a frame buffer provided within the RAM 1030, and causes the image data to be displayed on a display. Instead of this, the graphic controller 1085 may include within itself a frame buffer for storing image data generated by the CPU 1010 and the like.

The communication I/F 1040 performs communication with another device via a network. Also, the communication I/F 1040 functions as a hardware that performs communication. The hard disk drive 1050 stores programs and data used by the CPU 1010.

The ROM 1020 stores a boot program executed by the computer 1000 at startup, programs dependent on hardware of the computer 1000, and the like. The input/output chip 1080 connects various input/output devices to the input/output controller 1094 such as via a parallel port, a serial port, a keyboard port, and a mouse port, for example.

Programs provided to the hard disk drive 1050 via the RAM 1030 are provided by a user in a form stored in a recording medium such as an IC card. The programs are read out from the recording medium, installed onto the hard disk drive 1050 via the RAM 1030, and executed on the CPU 1010.

The programs installed onto the computer 1000 for causing the computer 1000 to function respectively as the communication terminal 100 or the image management server 200 may instruct the CPU 1010 or the like to cause the computer 1000 to function as each section of the communication terminal 100 or the image management server 200. The information processing described in these programs functions, by being read by the computer 1000, as the storage section 102, the image collecting section 104, the image processing section 105, the manipulation contents accepting section 106 and the display control section 108 that are specific means that software and the above-described various hardware resources cooperate with each other. Also, the information processing described in these programs functions, by being read by the computer 1000, as the storage section 202, the image collecting section 204, the image processing section 205, the manipulation contents accepting section 206 and the display control section 208 that are specific means that software and the above-described various hardware resources cooperate with each other. These specific means implement operations or processing of information according to the purpose of use of the computer 1000 in the present embodiment, and the communication terminal 100 or the image management server 200 that is specific for the purpose of use is thereby constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20 . . . network; 100 . . . communication terminal; 102 . . . storage section; 104 . . . image collecting section; 105 . . . image processing section; 106 . . . manipulation contents accepting section; 108 . . . display control section; 200 . . . image management server; 202 . . . storage section; 204 . . . image collecting section; 205 . . . image processing section; 206 . . . manipulation contents accepting section; 208 . . . display control section; 210 . . . image sending section; 300 . . . vehicle; 302 . . . control device; 310 . . . manipulation section; 320 . . . display section; 330 . . . wireless communication section; 340 . . . image capturing section; 350 . . . GNSS receiving section; 360 . . . sensor section; 400 display data; 401 . . . captured image display region; 402 . . . captured image; 403 . . . object arrangement region; 404 . . . traffic sign object; 405 . . . reference position; 406 . . . spot object; 410, 411, 412, 413, 414, 415 . . . captured image; 420, 421, 422, 423, 424, 425 . . . captured image; 430, 431, 432, 433, 434, 435 . . . captured image; 440, 441, 442, 443, 444, 445 . . . captured image; 450, 451, 452, 453, 454, 455 . . . captured image; 500 . . . road; 502 . . . traffic sign; 504 . . . branch; 520 . . . distance;

522 . . . distance; 524 . . . distance; 530 . . . distance; 532 . . . distance; 534 . . . distance; 1000 . . . computer; 1010 . . . CPU; 1020 . . . ROM; 1030 RAM; 1040 . . . communication I/F; 1050 . . . hard disk drive; 1080 . . . input/output chip; 1085 . . . graphic controller; 1092 . . . host controller; 1094 . . . input/output controller

What is claimed is:

1. A display control device comprising:
an image storing section for storing a plurality of captured images in association with image capturing locations on a road; and
a display control section for
causing a plurality of captured images to be successively displayed, each captured image corresponding to one of a plurality of positions that are identified based on a position of a currently displayed image and a user operation identifying a direction relative to the currently displayed image,
causing the captured image and an object that is related to an image capturing location of the captured image to be displayed such that the object is arranged on a display screen corresponding to the image capturing location for each captured image, the object representing a target that is positioned within a predetermined distance from the image capturing location,
arranging, for each captured image, the object on a position of the display screen that is based on a positional relationship between a position of the target and the image capturing location,
arranging the object relative to a reference position, and
arranging the object lower than the reference position in response to causing a subsequently captured image to be displayed, the subsequently captured image not including the target because the position of the target is behind the image capturing location.

2. The display control device according to claim 1, wherein
the display control section displays the captured image on a captured image display region of the display screen, and displays the object on an object arrangement region of the display screen, and
the captured image display region and the object arrangement region are provided on positions that do not overlap each other.

3. The display control device according to claim 1, wherein the display control section arranges, when causing a captured image of the target captured at the image capturing location to be displayed, the image capturing location being closer to the position of the target than another captured image is, the object on a reference position of the display screen.

4. The display control device according to claim 3, wherein the reference position is on a lower side of a center in an up-down direction on the display screen.

5. The display control device according to claim 3, wherein the display control section arranges, when causing a captured image of the target to be displayed, the captured image of the target being captured at the image capturing location that is in front of the position of the target, the object upper than the reference position as a distance between the image capturing location and the position of the target becomes larger.

6. The display control device according to claim 3, wherein the display control section arranges, when causing a captured image of the target to be displayed, the captured image of the target being captured at the image capturing location that is behind the position of the target, the object lower than the reference position as a distance between the image capturing location and the position of the target becomes larger.

7. The display control device according to claim 1, wherein the display control section causes the object to be displayed in a display size that is based on a positional relationship between the position of the target and the image capturing location.

8. The display control device according to claim 7, wherein the display control section causes the object to be displayed in a display size that becomes larger as the image capturing location is closer to the position of the target.

9. The display control device according to claim 1, wherein the plurality of captured images are captured images that are captured by a vehicle that travels on the road, and the object is a traffic sign object that represents a traffic sign placed within a predetermined distance from the image capturing location.

10. The display control device according to claim 1, wherein the object is a spot object that represents a spot that is positioned within a predetermined distance from the image capturing location.

11. The display control device according to claim 10, wherein the display control section arranges, when a position of the spot is positioned on a left side of a vehicle that captures the captured image, the spot object on a left side of the display screen, and arranges, when the position of the spot is positioned on a right side of a vehicle that captures the captured image, the spot object on a right side of the display screen.

12. The display control device according to claim 1, wherein the image storing section stores a captured image that is captured by a vehicle traveling on the road, and a vehicle speed at a time when the vehicle captures the captured image, and
the display control section arranges the object related to the image capturing location of the captured image according to the vehicle speed at the time when the vehicle captures the captured image.

13. The display control device according to claim 12, wherein the object is a traffic sign object that represents a traffic sign that is placed within a predetermined distance from the image capturing location, and
the display control section determines, as a reference position, to set a display position of the traffic sign object when displaying a first captured image that is of a plurality of captured images including the captured image and that is captured at an image capturing location that is closest to a sign position of the traffic sign, and determines to set the display position of the traffic sign object when displaying a second captured image that is a captured image captured at the image capturing location that is in front of the sign position and that is adjacent to the first captured image to be further apart upward from the reference position as the vehicle speed becomes faster.

14. The display control device according to claim 13, wherein the display control section determines to set the display position of the traffic sign object when displaying a third captured image that is a captured image captured at the image capturing location that is behind the sign position and that is adjacent to the first captured image to be further apart downward from the reference position as the vehicle speed becomes faster.

15. The display control device according to claim 1, wherein the display control section causes a captured image to be successively displayed, the captured image corresponding to each of a plurality of positions that are identified based on a flick operation by a user.

16. The display control device according to claim 1, wherein the display control section arranges, when a display of the captured image changes based on the user operation, the object such that an arrangement position of the object changes based on a change amount of the image capturing location of the captured image.

17. The display control device according to claim 1, wherein the display control section orients an upward direction with a direction of traveling forward to determine a position associated with the direction identified by the user operation.

18. The display control device according to claim 1, wherein the display control section orients an upward direction with a direction of traveling forward to determine a position associated with the direction that is identified based on a flick operation by a user.

19. A non-transitory computer-readable medium that stores a program for causing a computer to function as:
   an image storing section for storing a plurality of captured images in association with image capturing locations on a road; and
   a display control section for causing a plurality of captured images to be successively displayed, each captured image corresponding to one of a plurality of positions that are identified based on a position of a currently displayed image and a user operation identifying a direction relative to the currently displayed image, causing the captured image and an object that is related to an image capturing location of the captured image to be displayed such that the object is arranged on a position of a display screen corresponding to the image capturing location for each captured image, the object representing a target that is positioned within a predetermined distance from the image capturing location, arranging, for each captured image, the object on a position of the display screen that is based on a positional relationship between a position of the target and the image capturing location, arranging the object relative to a reference position, and arranging the object lower than the reference position in response to causing a subsequently captured image to be displayed, the subsequently captured image not including the target because the position of the target is behind the image capturing location.

* * * * *